(12) United States Patent
Yun

(10) Patent No.: US 9,234,769 B2
(45) Date of Patent: Jan. 12, 2016

(54) SYSTEMS AND METHODS FOR DETECTING SMALL PATTERN CHANGES IN SENSED DATA

(75) Inventor: Hae-Bum Yun, Chuluota, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 664 days.

(21) Appl. No.: 13/478,654

(22) Filed: May 23, 2012

(65) Prior Publication Data

US 2012/0303312 A1 Nov. 29, 2012

Related U.S. Application Data

(60) Provisional application No. 61/489,855, filed on May 25, 2011.

(51) Int. Cl.
*G01K 1/00* (2006.01)
*G01D 1/18* (2006.01)

(52) U.S. Cl.
CPC .................................. *G01D 1/18* (2013.01)

(58) Field of Classification Search
CPC ...................................................... G01D 1/18
USPC ........................................ 702/130, 189, 150
See application file for complete search history.

(56) References Cited

U.S. PATENT DOCUMENTS

| 7,817,254 | B2 | 10/2010 | Hegyi et al. |
| 7,818,254 | B1 | 10/2010 | Ma |
| 2003/0033094 | A1* | 2/2003 | Huang ............................. 702/39 |
| 2007/0030002 | A1* | 2/2007 | Frei et al. ....................... 324/309 |
| 2007/0265808 | A1* | 11/2007 | Kim ............................... 702/188 |
| 2008/0059086 | A1* | 3/2008 | Duron et al. ..................... 702/56 |
| 2008/0065337 | A1* | 3/2008 | Huang et al. ..................... 702/66 |

FOREIGN PATENT DOCUMENTS

| EP | 0493718 A2 | 8/1992 |
| JP | 2006317194 A | 11/2006 |
| KR | 100235249 B1 | 9/1999 |

OTHER PUBLICATIONS

Shahinpoor, M. (1980). "Statistical mechanical considerations on the random packing of granular materials." Power Technology, 25(2), 163-176.
Sheu, G. Y. (2006). "Direct back analysis by the meshless local petrov-galerkin method and Bayesian statistics." International Journal for Numerical methods in Geomechanics, 30, 823-842.
Song, et al. (2005). "Analysis of underground pipelines subjected to frost heaving forces." Key Engineering Materials, 297-300, 1241-1250.

(Continued)

*Primary Examiner* — Toan M Le
*Assistant Examiner* — Stephanie Bloss
(74) *Attorney, Agent, or Firm* — Timothy H. Van Dyke; Beusse, Wolter, Sanks & Maire, PLLC

(57) ABSTRACT

In one embodiment, a system and a method involve receiving a raw signal collected by a sensor that pertains to a temporal trend, creating a reference signal of a known amplitude and frequency, adding the reference signal to the raw signal to form a modulated signal, decomposing the modulated signal to obtain a decomposed signal, and conducting time-frequency analysis on the decomposed signal to detect abnormal patterns.

19 Claims, 12 Drawing Sheets

(56) References Cited

OTHER PUBLICATIONS

Swoboda, et al. (1999). "Back analysis of large geotechnical models." International Journal for Numerical and Analytical Methods in Geomechanics, 23, 1455-1472.

Talamucci, F. (2003). "freezing process in porous media: formation of ice lenses, swelling of the soil." Elsevier Mathematical and Computer Modeling, 37(5), 595-602.

Thomas, et al. (1999). "Inclusion of expansive clay behavior in coupled thermo hydraulic mechanical models." Engineering geology, 54, 93-108.

Thomas, et al. (1995). "Analysis of coupled heat, moisture and air transfer in a deformable unsaturated soil." Geotechnique, 45(4), 677-689.

Thomas, et al. (1999). "A coupled heat-moisture transfer theory for deformable unsaturated soil and its algorithmic implementation." International Journal for Numerical Methods in Engineering, 40(18), 3421-3441.

Thomas, et al. (1996). "On the development of a model of the thermo-mechanical-hydraulic behavior of unsaturated soils." Engineering geology, 41(1-4), 197-218.

Thomas, et al. (1999). "Three-dimensional coupled heat, moisture, and air transfer in adeformable unsaturated soil." International Journal for Numerical Methods in Engineering, 44, 919-943.

Thomas, et al (1999). "A sub-structure based parallel solution of coupled thermo-hydro-mechanical modeling of unsaturated." Engineering Computations, 16(4), 428-442.

Wang, et al. (1998). "A multi-frontal parallel algorithm for coupled thermo-hydro-mechanical analysis of deforming porous media." International Journal for Numerical Methods in Engineering, 43(6), 1069-1083.

Xiang, et al. (2003). "Optimal layout of displacement measurements for parameter identification process in geomechanics." International Journal of Geomechanics, 3(2), 205-216.

Xu, et al. (2004). Structural damage detection using empirical mode decomposition: Experimental investigation. ASCE Journal of Engineering Mechanics, 130(11), 1279-1288.

Yang, et al. (2003a). "System identification of linear structures based on Hilbert-Huang spectural analysis. Part 1: nomal modes." Earthquake Engineering and Structural Dynamics, 32, 1443-1467.

Wen, et al. (2006). "The Application of Wavelet-Kalman Hybrid Filter in EMD Edge Problem." Proceedings of Intelligent Systems Design and Applications, vol. 2, 745-748.

Yang, et al. (2003b). "System identification of linear structures based on Hilbert-Huang spectural analysis. Part 2: complex modes." Earthquake Engineering and Structural Dynamics, 32, 1533-1554.

Yang, et al. (2006). "Numerical simulation of frost heave with coupled water freezing, temperature and stress and stress fields in tunnel excavation." Computer and Geotechnics, 33, 330-340.

Yun, et al (2008). "Stochastic change detection in uncertain nonlinear systems using reduced-order models: system identification." Smart Materials and Structures, 17.

Yun, et al. (2009). "Stochastic change detection in uncertain nonlinear systems using reduced-order models: classification." Smart Materials and Structures, 18.

Zimmerman. R.W. (2000). "Coupling in poroelasticity and thermoelasticity." International Journal of Rock Mechanics and Mining Sciences, 37, 79-87.

Anandarajah, et al. (1991). "Computer-aided calibration of a soil plasticity model." International Journal for Numerical and Analytical Methods in Geomechanics, 15, 835-856.

Arai, et al. (1984). "Estimation of soil parameters based on monitored movement of subsoil under consolidation." Soils and Foundations, 24(4), 95-108.

Arai, et al. (1986). "Application of back-analysis to several test embankments on soft clay deposits." Soils and Foundations, 26(2), 60-72.

Arai, et al. (1983). "Simple optimization techniques for evaluating deformation moduli from field observations." Soils and Foundations, 23(1), 107-113.

Deering, et al. (2005). "the use of making signal to improve empirical mode decomposition." Preceedings of IEEE International Conference on Acoustics, Speech, and Signal Processing, 4: 485-488.

Beck, et al. (1998). "Inverse problems and parameter estimation: integration of measurements and analysis." Measurement Science and Technology, 9, 839-847.

Pal, et al. (1996). "Calibration of a constitutive model using genetic algorithms." Computer and Geotechnics, 19(4), 325-348.

Neuman, et al. (1979). "A statistical approach to the inverse problem of aquifer hydrology—1. Theory." Water Resources Research, 15(4), 845-860.

Brigham, et al, (2007). "Surrogate-model accelerated random search algorithm for global optimization with applications to inverse material identification." Computer Methods in Applied Mechanics and Engineering, 196, 4561-4576.

Cooley, R. L. (1982). "Incorporation of prior information on parameters into nonlinear regression groundwater flow models." Water Resources Research, 18(4), 965-976.

D'Odorico, et al. (2000). "Preferential states of seasonal soil moisture: the impact of climate fluctuations." Water Resources Research, 36(8), 2209-2219.

Murakami, et al. (1991). "Interpretation of ground performances based on back analysis results." Computer Methods and Advances in Geomechanics, G. Beer, J. R. Booker, and J. P. carter, eds., Balkema, Rotterdam. 1011-1015.

Gao, et al. (2004). "Identification of a constitutive model for geomaterials using new intelligent bionics algorithm." International Journal for Rock Mechanics and Mining Sciences, 41(3), 1-6.

Gioda, et al. (1980). "Direct search solution of an inverse problem in elastoplasticity: identification cohesion, friction angle and in situ stress by pressure tunnel test." International Journal for Numerical Methods in Engineering, 15, 1823-1848.

Masri, et al. (1999). "Training neural networks by adaptive random search techniques." Journal of Engineering Mechanics, 125, 123-132.

Ledesma, et al. (1996b). "Parameter and variance estimation in geotechnical back analysis using prior information." International Journal for Numerical and Analytical Methods in Geomechanics, 20, 119-141.

Honjo, et al. (1994a). "Application of Aikaike information criterion statistics to geotechnical inverse: the extended Bayesian method." Structural Safety, 14, 5-29.

Javadi, et al. (1999). "Identification of parameters for air permeability of shotcrete tunnel lining using a genetic algorithm." Computers and Geotechnics, 25, 1-24.

Kim, et al. (1997). "An equivalent model and back analysis technique for modeling situ consolidation behavior of drainage-installed soft deposits." Computer and Geotechnics, 20(2), 125-142.

Ledesma, et al. (1996a). "Estimation of parameters in geotechnical backanalysis—I. Maximum likelihood approach." Computers and Geotechnics, 18(1), 1-27.

Yun, et al., "Nonparametric Monitoring for Geotechnical Structures Subject to Long-Term Environmental Change," Advances in Civil Engineering, vol. 2011, Article ID 275270.

Bagi, K. (2003), "Statistical Analysis of Contact Force Components in Random Granular Assemblies," Granular Matter, 5, 45-54.

Coughlin, K.T. and Tung, K.K. (2004). "11-year solar cycle in the stratosphere extracted by the empirical mode decomposition method." Advances in Space Research, 34, 323-329.

Dai, F.C. and Lee, C.F. (2001). "Terrian-based mapping of landslide susceptibility using a geographical information system: a case study." Canadian Geotechnical Journal, 38, 911-923.

Folle, et al. (2006). "Geotechnical modeling of the subsoil of Rome (Italy) by means of multivariate geostatistics." AMG '06 11th International Congress, International Association for Mathematical Geology, Liege, Belgium, Sep. 3-8.

Gioda, G. and Sakura, S. (1987). "Back analysis procedures for the interpretation of field measurements in geomechanics." International Journal for Numerical and Analytical Methods in Geomechanics, 11, 555-583.

Goddard, J.D. (2004). "On entropy estimates of contact forces in static granular assemblies." International Journal of Solids and Structures, 41, 5851-5861.

(56) References Cited

OTHER PUBLICATIONS

Huang, Norden E., et al. (2003). "A confidence limit for the empirical mode decomposition and Hilbert spectral analysis." Proceedings of the Royal Society of London. Series A: Mathematical, Physical and Engineering Sciences 459, 2317-2345.

Ichikawa, et al. (1992). "A parameter identification procedure as a dual boundary control problem for linear elastic materials." Soils and Foundations, 32(2), 35-44.

Iyengar, R. N., & Kanth, S. R. (2005). Intrinsic mode functions and a strategy for forecasting Indian monsoon rainfall. Meteorology and Atmospheric Physics, 90(1-2), 17-36.

Janosi I.M. and Muller, R. (2005). "Empirical mode decomposition and correlation properties of long daily ozone records." Physical Review E, 71, 056126.

Kerschen, G. and Golinval, J.-C. (2002). "Non-linear generalization of a principal component analysis: from a global to a local approach." Journal of Sound and Vibration, 254(5), 867-876.

Kerschen, G. and Golinval, J.C. (2002). "Physical interpretation of the proper orthogonal modes using the singular value decomposition." Journal of Sound and Vibration, 249(5), 849-865.

McDonald, et al. (2007). "Empirical mode decomposition of the atmospheric wave field." Annales Geophysicae, 25, 375-384.

Molla, M. K. I., Sumi, A., & Rahman, M. S. (2006). Analysis of temperature change under global warming impact using empirical mode decomposition. International Journal of Information Technology, 3(2), 131-139.

Ooi, et al. (2002). "Performance of a single-propped wall during excavation and during freezing of the retained soil." Computer and Geotechnics, 29, 387-409.

Radić, V Pasarie, Z., & Sinik, N. (2004). Analysis of Zagreb climatological data series using empirically decomposed intrinsic mode functions. Geofizika, 21(1), 15-36.

Rempel, et al. (2004). "Premelting dynamics in a continuum model of frost heave." Journal of Fluid Mechanics, 498, 227-244.

Rilling, et al. (2003). "On empirical mode decomposition and its alogrithms." IEEE-EURASIP Workshop on Nonlinear Signal and Image processing NSIP-03, Grado.

Setzer, M. J. (2001). Micro-ice-lens formation in porous solid. Journal of Colloid and Interface Science, 243(1), 193-201.

Shahin, M. A., Jaksa, M. B., & Maier, H. R. (2003). Neurofuzzy networks applied to settlement of shallow foundations on granular soils. In Proc., ICASP, 9th Int. Conf. on Applications of Statistics and Probability in Civil Eng (vol. 2, pp. 1379-1383). San Francisco, Millpress, Rotterdam, The Netherlands.

Varadarajan, et al. (2003). "Response control of building with variable stiffness tuned mass damper using empirical mode decomposition and Hilbert transform algorithm." 16th ASCE Engineering Mechanics Conference, Seattle, Washington.

Wang, et al. (2003). "Numerical solutions for flow in porous media." International Journal for Numerical and Analytical Methods in Geomechanics, 27(7), 565-583.

Baise, et al. (2001). "Consistency of dynamic site response at Port Island." Earthquake Engineering and Structural Dynamics, 30, 803-818.

Cividini, et al. (1981). "Some aspects of 'characterization' problems in geomechanics." International Journal of Rock Mechanics and Mining Sciences, 18, 487-503.

Gens, et al. (1996). "Estimation of parameters in geotechnical backanalysis—II. Application to a tunnel excavation problem." Computer and Geotechnics, 18(1), 29-46.

Glaser, S. D. (1995). "System identification and its application to estimation soil properties." Journal of Geotechnical Engineering, 121(7), 553-560.

Glaser, et al. (2000). "System identification estimation of soil properties at the Lotung site." Soil Dynamics and Earthquake Engineering, 19, 521-531.

Glaser, S. D. (2006). "Downhole seismic arrays and system identification of soil response." 4th International Conference of Earthquake Engineering, Taipei, Taiwan, Oct. 12-13.

Glaser, et al. (1996). "Estimation of system damping at the lotung site by application of system identification." Report No. NIST GCR 96-700, Colorado School of Mines.

Haber, et al. (2000). "On optimization techniques for solving nonlinear inverse problems." Inverse Problems, 16(5), 1263-1280.

Honjo, et al. (1991). "Prediction of future subsidence with quantified uncertainty by an inverse analysis." Proceedings of 4th International Symposium on Land Subsidence, A. I. Johnson, ed., Houston, TX, USA. 625-634.

Honjo, et al. (1994). "Inverse analysis of an embankment on soft clay by extended Bayesian method." International Journal for Numerical and Analytical Methods in Geomechanics, 18, 709-734.

Jonsson, Patrik. (2009). Road status sensors: a comparison of active and passive sensors. In the 16th ITS World Congress and Exhibition on Intelligent Transport Systems and Services. Stockholm, Sweden.

Juga, Ilkka. (2010). "Sea-effect snowfall—a special hazard for road traffic in the coastal areas of Finland." In Proceedings of the 15th Sirwec Conference. Quebec City, Canada, Feb. 5-7.

Kim, D. and Oh, H.-S. (2009). "EMD: A Package for Empirical Mode Decomposition and Hilbert Spectrum." The R Journal, vol. 1/1, 40-46.

Knollhoff, et al. (2003). "Evaluation of frost accumulation model." Meteorological Applications 10, No. 4, 337-343.

NCHRP. (2006). Test Methods for Evaluating Field Field Performance of RWIS Sensors Prepared for : National Cooperative Highway Research Program Submitted by: Analysis. vol. 87, Washington, D.C., USA.

ODOT. (2003). Evaluation of ODOT Roadway/Weather Sensor Systems for Snow and Ice Removal Operations / RWIS. Part III: Optimization of Salt Brine Pre-Treatment Application Rates and Frequency. Transportation Research. Columbus, Ohio, USA.

ODOT. (2006). Evaluation of ODOT Roadway/Weather Sensor Systems for Snow and Ice Removal Operations / RWIS. Part IV: Optimization of Pretreatment of Anti-Icing Protocol. vol. 14758. Columbus, Ohio, USA.

Polumetla, Aditya. (2006). "Machine Learning Methods for the Detection of RWIS Sensor Malfunctions." The University of Minnesota, Thesis for M.S. Degree.

Rauhala, J. and Juga, Ilkka (2010). "Wind and Storm Impacts of Society." In Proceedings of the 15th SIRWEC Conference. Quebec City, Canada, Feb. 5-7.

Ryerson, C.C. and Ramsay, A.C. (2007). "Quantitative Ice Accretion Information from the Automated Surface Observing System." Journal of Applied Meteorology and Climatology 46, No. 9: 1423-1437.

Schedler, Karl E. (2008). "Smart and reliable roadside monitoring system with UMB technology." In the Lakeside Conference of Safety in Mobility 2008, 1-7.

Schedler, K.E. and Sting!, P. (2008). "Intelligent UMB Road Sensors and Advanced Road Weather Information System (ARWIS)." In International Road Weather Conference, May 14-16, Prague, Czech Republic.

Trb. (2008). Impact of Airport Pavement Deicing Products on Aircraft and Airfield Infrastructure. Edited by Xianming Shi. Transportation Research Board. Washington, D.C., USA.

Jaksa, et al. (2008). "Future challenges for artificial neural network modeling in geotechnical engineering." The 12th International Conference of international Association for Computer Methods and Advances in Geomechanics (IACMAG), Goa, India, Oct. 1-6.

Levasseur, et al. (2008). "Soil parameter identification using a genetic algorithm." International Journal for Numerical and Analytical Methods in Geomechanics, 32, 189-213.

Longobardi, A. (2008). "Observing soil moisture temporal variability under under fluctuating climatic conditions." Hydrology and Earth System Sciences Discussions, 5, 935-969.

Schofield, A. and Wroth, P. (1968). Critical State Soil Mechanics. McGraw-Hill, London, UK.

Shahin, M. A., Jaksa, M. B., & Maier, H. R. (2001). Artificial neural network applications in geotechnical engineering. Australian Geomechanics, 36(1), 49-62.

Troendle, C.A. and Reuss, J.O. (1997). "Effect of clear cutting on snow accumulation and water outflow at Fraser, Colorado." Hydrology and Earth System Sciences, 1(2), 325-332.

(56) References Cited

OTHER PUBLICATIONS

Zhang, et al. (2009). "Simulation-based calibration of geotechnical parameters using parallel hybrid moving boundary particle swarm optimization." Computers and geotechnics., 36(4), 604-615.
Andersson, et al. (2010). "Road Friction Estimation, part II." IVSS Project Report Technology. Gothenburg, Sweden. www.ivss.com.
Bridge, Paul (2008). "Non-invasive road weather sensors." 4th National Conference on Surface Transportation Weather, Jun. 16-17, Indianapolis, Indiana, USA.
Casselgren, Johan (2007) "Road Surface Classification Using Near Infrared Spectroscopy." Licencite Thesis, Lulea University of Technology, Dept of Applied Physics and Mechanical Engineering.
Crouch, et al. (2009). Automatic detection of RWIS Sensor Malfunctions (phase 1). Systems Research. Minneapolis, Minnesota, USA 2009.
Donau, Pierre (2000). "Water film thickness measurement on road surfaces by means of an early ice warming sensor." In Proceedings of the 10th SIRWEC Conference, 176-181. Davos, Switzerland, Mar. 22-24.
Haavasoja, T., & Pilli-Sihvola, Y. (2010, Feb.). Friction as a measure of slippery road surfaces. In Proceedings of SIRWEC 15th International Road Weather Conference (pp. 5-7), Quebec, Canada.
Hippi, Marjo et al. (2010) "A statistical forecast model for road surface friction." In Proceedings of the 15th SIRWEC Conference. Quebec City, Canada, Feb. 5-7.
Johansson, et al. (2007). "Spatial and temporal variations of PM10 and particle number concentrations in urban air." Environmental monitoring and assessment 127, 477-487.
Akutagawa, et., (1991), "The back analysis of in-situ stresses in a multiple stage excavation problem", Computer Methods and Advances in Geomechanics, G. Beer, J.R. Booker, and J.P. Carter, eds. 937-942.
Arai, et al., (1991), "Camparison of static and statistical methods for back-analysis of elastic consolidation problems", Computer Methods and Advances in Geomechanics, G. Beer, J.R. Booker, and J.P. Carter, eds., Balkema, Rotterdam. 949-954.
Arduino, et al., "Implementations of porous media formulation for geomaterials", Journal of Engineering Mechanics, 127(2), 157-166.
Roscoe, et al. (1968). "On the generalized stress-strain behavior of 'wet' clay", chapter Engineering Plasticity, 535-609. Cambridge University Press, Cambridge.
Cervera, et al. (1996), "On the Computational Efficiency and Implementation of Block-Iterative Algorithms for Nonlinear coupled Problems", Engineering Computations, 13(6, 4-30.
Cividini, A., Maier, G., and Nappi, A. (1983). "Parameter estimation of a static geotechnical model using a Bayes approach." International Journak for Numerical and Analytical Methods in Geomechanics, 20(5), 215-226.
Delechelle, E. Lemoine, J., and Niang, O. (2005). "Empirical mode decomposition: an analytical approach for sifting process."IEEE Signal Processing Letters, 12(11), 764-767.
Francisco,P., et al. "Simulation and analysis of frost heaving in subsoils and granular fills of roads." Elsevier Cold Regions Science and Technology, 25, 89-99.
Fu, et al. (2007). "Integration of Laoratory testing and constitutive modeling of soils." Computer and Geotechnics, 34, 330-345.
Gawin, et al. (1996). Thermo-hydro-mechanical analysis of partially saturated porous materials. Engineersing Computations, 13(7), 113-143.
Shoji, et al. (1990). "Two-dimensional consolidation back analysis." Soils and Foundations, 30(2), 60-78.
Ghaboussi, J., Garrett Jr., J., and Wu, X. (1991). "Knowledge-Based Modeling of Material Behavior with Neural Networks." Journal of Engineering Mechanics 117(1), 132-153.
Ghaboussi, J., Pecknold, D.A., and Zhang, M. Haj-Ali, R. (1998). "Autoprogessive training of neural network constitutive models." International Journal for Numerical Methods in Engineersing, 42(1), 105-126.

Gioda, G. (1980). "Indirect identification of the average elastic characteristics of rock masses." Proceedings of the International Conference on Structural Foundations on Rock, Sydney.
Hashash, et al. (2004). "Numerical implementation of neural network based material model in finite element analysis." International Journal for Numerical Methods in Engineering, 59(7), 898-1005.
Hashash, et al. (2003). "Systematic update of a deep excavation model using field performance data." Computer and Geotechnics, 30(6), 477-488.
Hashash, et al. (2006). "Novel approach to integration of numerical modeling and field observations for deep excavations." Journal of Geotechnical and Geoenvironmental Engineering, 123(8), 1091-1031.
Honjo, et al. (1994). "Inverse analysis of an embarkment on soft clay by extended Baysian method." International Journal for Numerical and Analytical Methods in Geomechanics, 18, 709-734.
Shoji, et al. (1989). "Safety control of embankment foundation based on elasto-plastic back analysis." Soils and Foundations, 29(2), 112-126.
Huang, et al. (1998). "The empirical mode decomposition and the Hilbert spectrum for nonlinear and non-stationary time series analysis." Royal Society of London Proceedings Series A, 454(1971), 903-995.
Jing, L. (2003). "A review of techniques, advances and outstanding issues in numerical modelling for rock mechanics and rock engineering." International Journal of Rock Mechanics and Mining Sciences, 40, 283-353.
Jollife, I.T. (2002). Principle Component Analysis. Springer Series in Statistics. Springer, New York, 2 edition.
Jung, et al. (2006). "Neural network constitutive model for rate-dependent materials." Computers and Structures, 84, 955-963.
Klisinski, M. (1988). "Plasticity theory based on fuzzy sets." Journal of Engineering Mechanics, 114(4), 563-582.
Komac, M. (2006). "A landslide susceptibility model using the Analytical Hierarchy Process method and multivariate statistics in a perialpine Slovenia." Geomorphology, 74, 17-28.
Konrad, J.M. (2002). "Prediction of freezing-induced movements for an underground construction project in Japan." Canadian Geotechnical Journal, 39, 1231-1242.
Kruyt, N. P. (20030. "Contact forces in anisotropic frictional granular materials." International Journal of Solids and Structures, 40(13-14), 3537-3556.
Kruyt, N. P. and Rothenburg, L. (2002). "Probability density functions of contact forces for cohesionless frictional granular materials." International Journal of Solids and Structures, 39(3), 571-583.
Kudryavtsev, S.A. (2004). "Numerical modeling of the freezing, frost heaving, and thawing of soils." Soil Mechanics and Foundation Engineering, 41(5), 177-184.
Kung, et at. (2007). "A neural network approach to estimating deflection of diaphragm walls caused by excavation in clays." Computers and Geotechnics, 34385-396.
Lai, et al. 92002). "Numerical simulation for the copied problem of temperature and seepage fields in cold region dams." Journal of Hydraulic Research, 40(5), 631-635.
Lai, et al. (2001). "Nonlinear analysis for the semicoupled problem of temperature, seepage and stress fields in cold region retaining walls." Journal of Thermal Stresses, 24, 1199-1216.
Lai, et al. (2005). "Nonlinear analysis for frost-heaving force of land bridges on qing-tibet railway in cold regions." Journal of Thermal Stresses, 28, 317-331.
Ledesma, et al. (1991). "Identification of parameters of nonlinear geotechnical models." Computer Methods and Advances in Geomechanics, G. Beer, J. R. Booker, and J. P. Carter, eds., Balkema, Rotterdam. 1005-1010.
Li, et al. (2002). "Theoretical frame of the saturated freezing soil." Elsevier Cold Regions Science and Technology, 35, 73-80.
Loh, et al. (2001). Application of the empirical mode decomposition-Hilbert spectrum method to identify near-fault ground-motion characteristics and structural responses. Bulletin of the Seismological Society of America, 91(5), 1139-1357.
Yang, et al. (2007). "On the efficiency of chaos optimization algorithms for global optimization." Chaos Solutions and Fractals, 34, 1366-1375.

(56) References Cited

OTHER PUBLICATIONS

Zheng, et al. (2004). "Time domain identification of dynamic properties of layered soil by using extended Kalman filter and recorded seismic data." Earthquake Engineering and Engineering Vibration, 3(2), 237-247.

Yuanming, et al. (2005). "Ninlinear analysis for frost-heaving force of land bridges in Qing-Tibet railway in cold regions." Journal of Thermal Stresses 28(3), 317-331.

Masters, et al. (2000). "Coupling temperature to a double-porosity model of deformable porous media." International Journal for Numerical Methods in Engineering, 49, 421-438.

Miller, R.D. (1972). "Freezing and heaving of saturated and unsaturated solid." Highway Research Record, 393, 1-11.

Newman, et al (1997). "Heat and mass transfer in unsaturated soils during freezing." Canadian Geotechnical Journal, 34, 63-70.

Ni, et al (1996). "A fuzzy neural network approach to evaluation of slope failure potential." Journal of Microcomputers in Civil Engineering. 11, 59-66.

Nithiarasu, et al. (2000). "Non-Darcy natural convection in a hydrodyamically and thermally anisotropic porous medium." Computer Methods in Applied Mechanics and Engineering, 188, 413-430.

Pines, et al. (2006). "Structural health monitoring using empirical mode decomposition and Hilbert phase." Journal of Sound and Vibration, 294, 97-124.

Reddi, et al. (1991). "Probabilistic analysis of ground-water levels in hillside slopes." "ASCE Journal of Geotechnical Engineering", 117(6), 872-890.

Sakurai, S. (19920. "Field measurement and back analysis." Computer Methods and Advances in Geomechanics, G. Beer, J. R. Booker, and J. P. Carter, eds., Balkema, 1693-1701.

Schrefler, B. A. (2001). "Computer modeling in environmental geomechanics." Elsevier Computers and Structures, 79, 2209-2223.

Selvaduraia, et al. (1999a). "Computational modeling of frost heave induced soil pipeline interaction: I. modeling of frost heave." Elsevier Cold Regions Science and Technology, 29(3), 215-228.

Selvaduraia, et al. (1999b). "Computational modeling of frost heave induced soil pipeline interaction: II. Modeling of experiments at the caen test facility." Elsevier Cold Regions Science and Technology, 29(3), 229-257.

International Search Report for PCT/US2012/039138, mailed Jan. 2, 2013.

* cited by examiner

SYSTEMS AND METHODS FOR DETECTING SMALL PATTERN CHANGES IN SENSED DATA

CROSS-REFERENCE TO RELATED APPLICATION(S)

This application claims priority to co-pending U.S. Provisional Application Ser. No. 61/489,855, filed May 25, 2011, which is hereby incorporated by reference herein in its entirety.

BACKGROUND

Sensors are often used to obtain data that is useful in evaluating a system or a situation. For example, it may be desirable to use sensors to monitor the movement of a retaining wall for any indication that the wall is at risk of toppling. As another example, it may be desirable to use sensors to detect the formation of ice on the surface of a road. In such situations, the sensed data can be analyzed and conclusions can be drawn from the analysis.

In certain circumstances, it is difficult to identify the data that is needed to draw conclusions about a system or situation because of other data in the signal. For example, in the case of the retaining wall monitoring, it may be difficult to identify the effect of precipitation on the retaining wall because the effects of temperature expansion are so much greater in magnitude. In the case of the ice formation detection, it may be difficult to detect precipitation on a road surface because the effects of ambient temperature change are so much greater in magnitude. In both situations, small pattern changes are difficult to identify due to the presence of substantial environmental effects, which act as noise that conceals the small pattern changes.

From the above discussion, it can be appreciated that it would be desirable to have a system or method that can be used to detect such small pattern changes in sensed data.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

Figure 1:
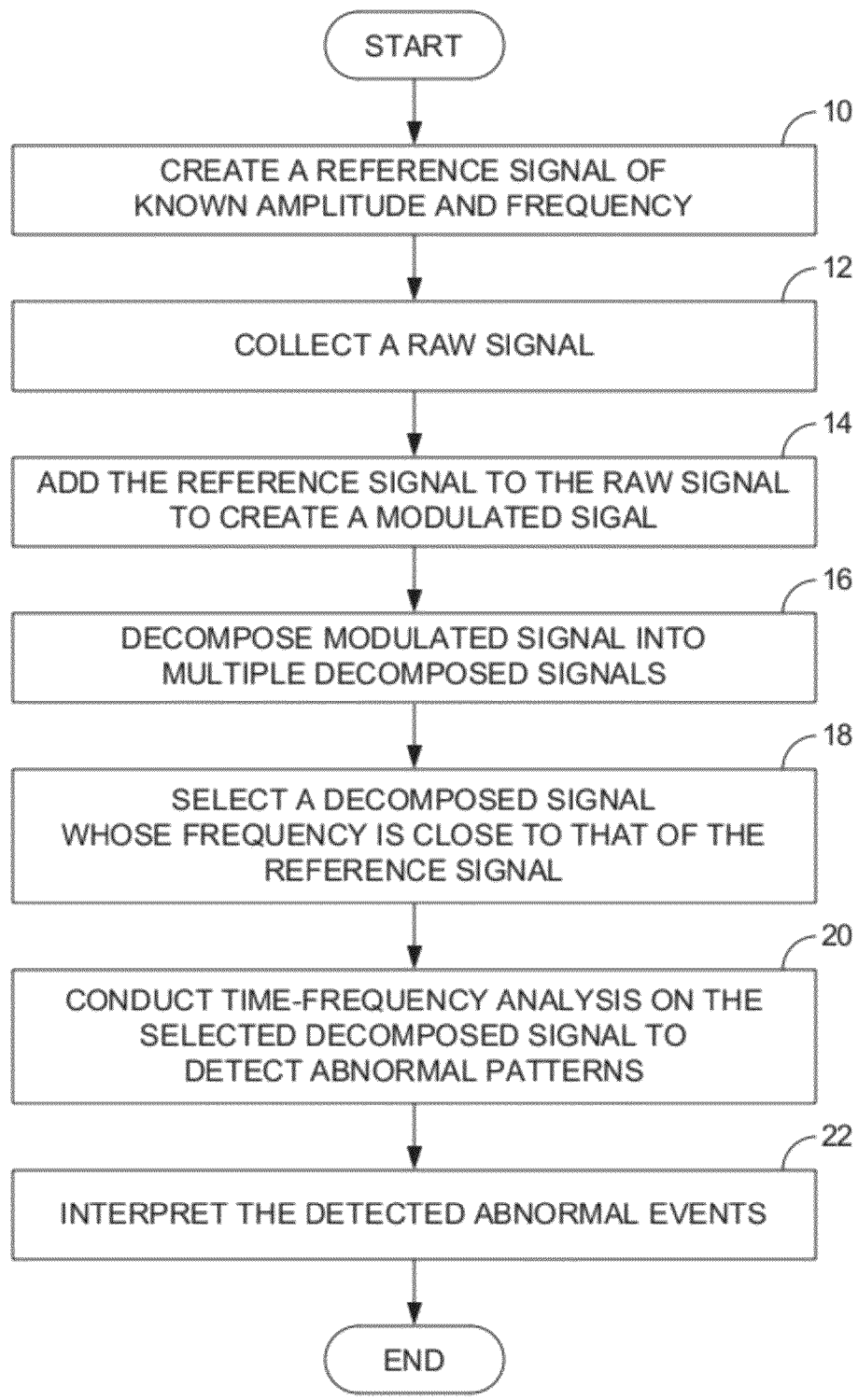
FIG. 1 is a flow diagram of an embodiment of a method for performing an auto-modulating pattern (AMP) process.

As described above, it would be desirable to have a system or method that can be used to detect small pattern changes in sensed data. Disclosed herein are examples of such systems and methods. In some embodiments, the systems and methods employ auto-modulating pattern (AMP) detection. As is described below, AMP detection is particularly useful in detecting small but important information that is usually obfuscated by other information, such as environment-related information. In some embodiments, the AMP detection is performed using an AMP sensor that can transmit raw and/or processed data can be used to identify a dangerous an emergency condition, such as vulnerability of a retaining wall or the formation of ice on a roadway.

In the following disclosure, various system and method embodiments are described. It is to be understood that those embodiments are merely example implementations of the disclosed inventions and that alternative embodiments are possible. All such embodiments are intended to fall within the scope of this disclosure.

Empirical Mode Decomposition

The Empirical Mode Decomposition (EMD) method is a data processing technique developed to deal with nonlinear non-stationary signals. EMD is widely used in science and engineering when time-dependent natural phenomena is to be studied, such as meteorology, atmospheric physics, and seismology. An arbitrary time-dependent signal x(t) can be expressed as a series expansion of m-number of intrinsic mode functions (IMFs) that represent oscillatory modes combined in x(t):

$$x(t) = \sum_{k=1}^{m} IMF_k + r(t) \tag{1}$$

where r(t) is the residual. The IMF is defined to have local zero means and the same number of zero crossings and extrema. The decomposition of x(t) into IMFs is called the sifting process, and several sifting algorithms have been developed.

The Hilbert-Huang Transform (HHT) method is a time-frequency analysis technique combined with the EMD method. Let $x'_k(t) = IMF_k$, then the corresponding analytical signal is defined as $$z'_k(t) = x'_k(t) + iy'_k(t) = a(t)e^{i\theta(t)} \tag{2}$$

where $$y'_k(t) = \frac{1}{\pi} P \int_{-\infty}^{\infty} \frac{x(\tau)}{t - \tau} d\tau \tag{3}$$

$$a(t) = \sqrt{x'_k(t)^2 + y'_k(t)^2} \tag{4}$$

$$\theta(t) = \tan^{-1} \frac{y'_k(t)}{x'_k(t)} \quad (5)$$

and P is the Cauchy principal value. It should be noted that $y'_k(t)$ is the convolution of $x'_k(t)$ with $1/\tau$ that is sensitive to the local properties of $x'_k(t)$. In addition, the time-dependent functions, $\alpha(t)$ and $\theta(t)$, provide the best local fit of $x'_k(t)$. The instantaneous frequency can be determined as $$\omega(t) = \frac{d\theta(t)}{dt} \quad (6)$$

Auto-Modulating Pattern (AMP) Detection

Auto-modulating pattern (AMP) detection is a novel data processing technique that is an extension of the EMD-HHT method and can be used to detect an event of interest whose signature is overshadowed by other various dominant effects entangled together in nonlinear non-stationary signals. AMP detection is particularly useful in field monitoring applications to detect the occurrence of anomalous events under significant (and possibly unknown) environmental variations.

The AMP process described below utilizes a unique property of EMD known as mode mixing. Because EMD traces the highest frequency components in a given signal locally, the presence of intermittence distorts the shape of the current IMF and subsequent sifting process. Consequently, different modes of oscillations coexist in a single IMF. The effect of mode mixing due to intermittence is significant in EMD because its basis functions (i.e., IMFs) are determined "empirically" from given data. For the same reason, the mode mixing effect is less significant in time-frequency analysis methods using predetermined basis functions, such as the wavelet transform.

Mode mixing is considered an undesirable characteristic of EMD in many applications where deterministic and theoretical decomposition results are required, and numerous techniques have been developed to reduce this effect. In the AMP process, however, the mode-mixing phenomenon is utilized as a necessary property of EMD, instead of being avoided, to improve the detectability of subtle pattern changes in complex non-stationary signals. An arbitrary signal $x(t)$ can be expressed as $$x(t) = e(t) + m(t) \quad (7)$$

where $e(t)$ is event signal, and $m(t)$ is masking signal. In many field monitoring applications, $m(t)$ is usually the combination of time-dependent variation affected by numerous environmental factors (e.g., structural behavior due to daily and seasonal ambient temperature variation), and $e(t)$ is a very small intermittent event of interest (e.g., structural behavior due to damage). Thus, the goal of the AMP process is (i) to detect the occurrence of event, $e(t)$, which is masked by the dominant component of $m(t)$ in the non-stationary signal of $x(t)$, and (ii) to determine the occurrence time with high temporal accuracy.

In the AMP process, the arbitrary signal $x(t)$ is modulated with a user-defined modulating sinusoidal signal, $\mu^*(t)$:

$$x^*(t) = e(t) + m(t) + \mu^*(t) \quad (8)$$

where $x^*(t)$ is the modulated signal of $x(t)$, and the superscript * denotes user-defined modulation. Due to mode mixing, the IMF closest to the original $\mu^*(t)$, i.e., IMF($\mu^*$), would be affected with the intermittence of $e(t)$ in the sifting process, so that the occurrence of $e(t)$ could be detected after the time-frequency analysis of the IMF($\mu^*$) using the HHT.

The AMP process can be summarized as first modulating $x(t)$ with the user-defined signal, $\mu^*(t)$; then decomposing the modulated signal, $x^*(t)$, using the EMD to find the IMF($\mu^*$); and finally performing HHT to detect the intermittence effect of $e(t)$ in the time-frequency plot of the IMF($\mu^*$). FIG. 1 is a flow diagram of an example AMP process.

Figure 9:
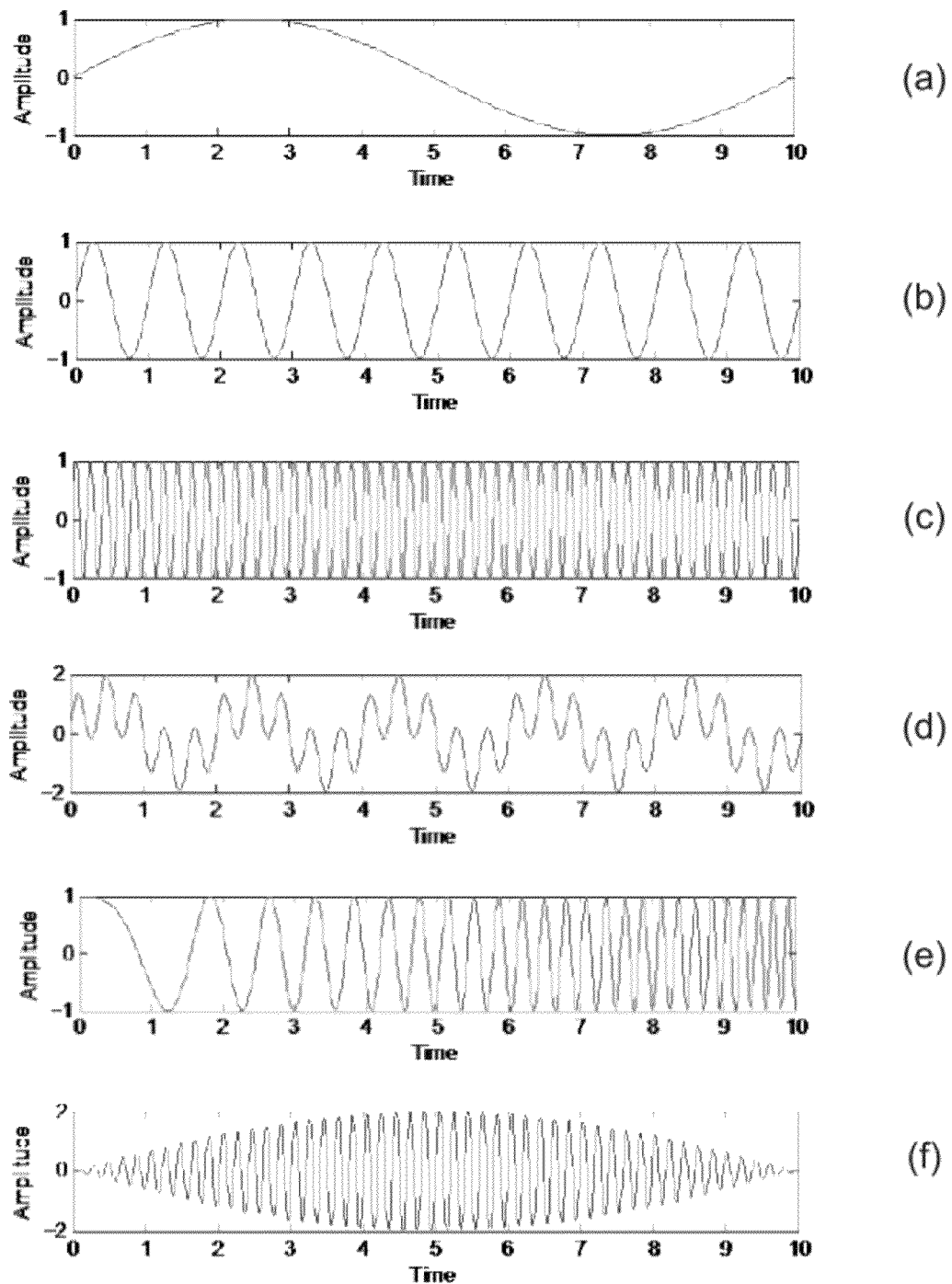
FIGS. 9(a)-(f) are diagrams that illustrate example monotonic and multitonic sinusoidal signals that can be used as a reference signal in the AMP process.

Beginning with block 10 of FIG. 1, a reference signal having a known amplitude and frequency is created. Various mathematical functions can be selected for the reference signal. Example reference signals include sinusoidal, sine-sweep, beating, square, sawtooth, or broadband random functions. The reference signal that is most preferable may depend upon the underlying application. In addition, the amplitude and frequency of the reference signal can be selected depending upon the application. Example reference signals are shown in FIG. 9. Regardless of what type of reference signal is used, the length (in terms of the number of data points) of the reference signal should be the same as the raw signal.

Referring next to block 12, a raw signal is collected. The raw signal can be collected using various types of sensors. Examples of sensors that can be used include displacement sensors, velocity sensors, acceleration sensors, strain sensors, slope sensors, temperature sensors and the like.

Next, the reference signal is added to or mixed with the raw signal to create a modified signal, as indicated in block 14. The mixing can be achieved using a hardware (physical) approach or a software (synthetic) approach. In the hardware approach, the sensor readings can be physically modulated with a mechanical actuator or motor whose motion is controlled with the reference signal. In the software approach, the reference signal is synthetically mixed with the raw sensor signal with a computer using an appropriate software program. Because the selection of the optimal reference signal for the given raw signal depends upon the underlying application, multiple reference signals with different amplitudes and frequencies can be mixed with the raw signal in parallel, and each modulated signal can be processed separately to maximize the efficiency of the analysis.

With reference next to block 16, the modulated signal is decomposed into multiple decomposed signals. In some embodiments, the decomposition is performed using a non-stationary decomposition technique, such as the wavelet decomposition method (WDM) or the empirical mode decomposition (EMD). Once the decomposition has been performed, a decomposed signal whose frequency is close to the reference signal frequency is selected, as indicated in block 18.

Referring next to block 20, time-frequency analysis is conducted on the selected decomposed signal to detect abnormal patterns. The occurrence of abnormal patterns in the raw signal can be detected as peaks. In some embodiments, the time-frequency analysis is performed using the wavelet transform (WT) or the Hilbert-Huang transform (HHT). The baseline frequency of the selected decomposed signal should be near the frequency of the reference signal in the time-frequency plot.

Turning to block 22, any detected abnormal events are interpreted. In some embodiments, physical interpretation of the abnormal events can be made using additional information of the structures where the raw signal was measured.

Figure 2:
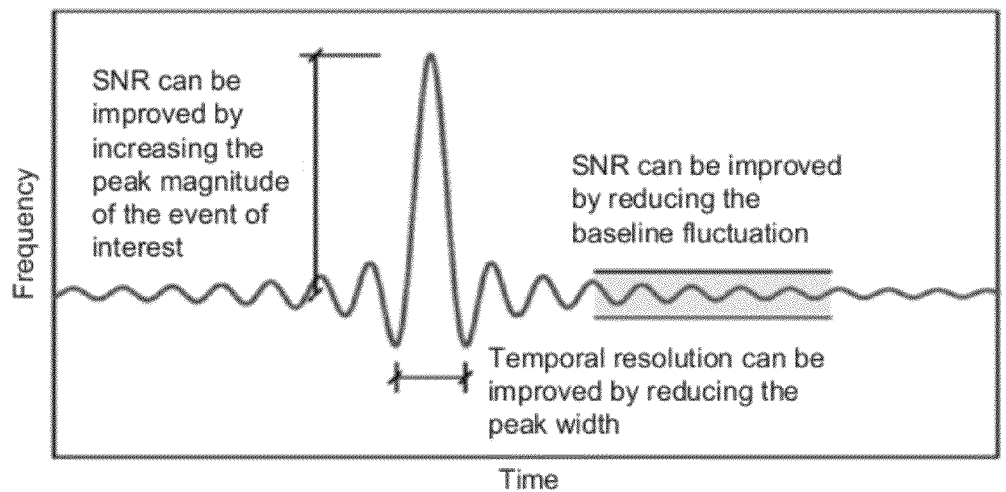
FIG. 2 is a diagram that illustrates the detectability of an anomalous event of interest using time-frequency analysis.

The AMP process described above improves the detectability of anomalous event occurrence by "amplifying" small effects of $e(t)$ masked by dominant $m(t)$ in the following two ways: (i) signal-to-noise ratio (SNR), and (ii) temporal resolution of detection. As illustrated in FIG. 2, the SNR can be improved by increasing the peak magnitude of the event and/or reducing the fluctuation of the baseline frequency. In the AMP process, the user-defined sinusoidal signal, $\mu^*(t)$, lays the flat baseline in the time-frequency plot. The temporal resolution also can be improved using a higher frequency of $\mu^*(t)$ than the frequency of m(t); thus the peak width in FIG. 2 would be reduced.

Parametric Study

The peak magnitude and width shown in FIG. 2 largely depends on the amplitude and frequency of $\mu^*(t)$. Thus, a series of parametric studies were conducted to find the optimal characteristics of $\mu^*(t)$.

The following three stopping criteria of the sifting algorithm were used in the EMD process:

1. At each point (mean_amplitude)<THREASHOLD2 * (envelope_amplitude)
2. Mean of Boolean array {(mean_amplitude)/ (envelope_amplitude) >THRESHOLD}<TOLERANCE
3. |# zeros−# extrema|≤1 where THRESHOLD=0.05, THRESHOLD2=0.5, and TOLERENCE=0.05 for all weather chamber data sets used in the study. The maximum iteration of the sifting process was set to be 2000.

Figure 3A:
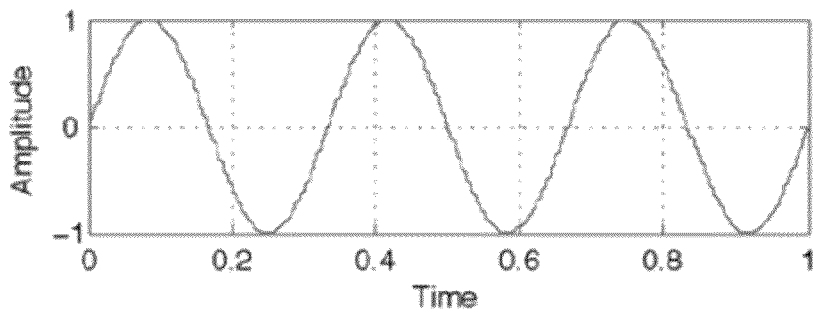
FIGS. 3(a)-(d) are graphs of sample signals used in a parametric study.
Figure 3B:
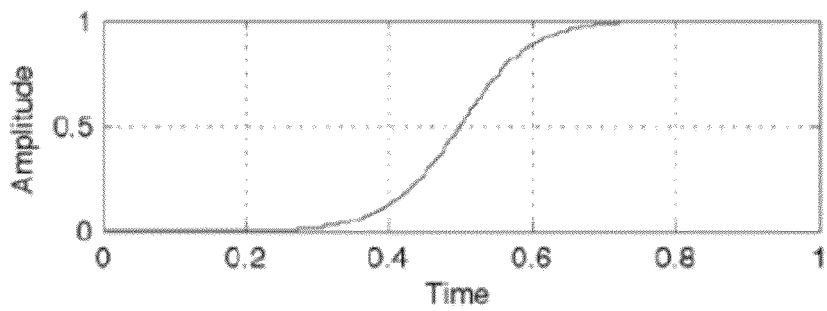
Figure 3C:
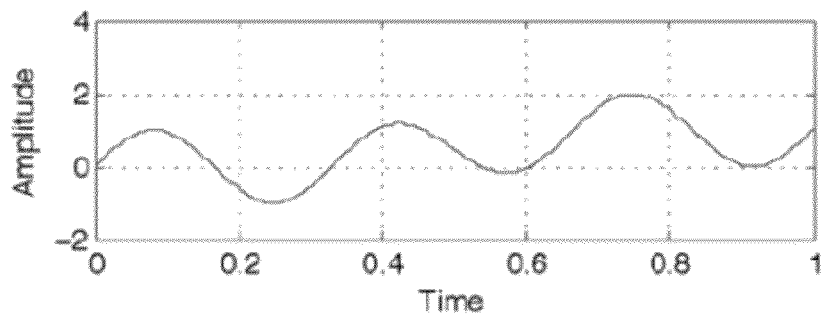
Figure 3D:
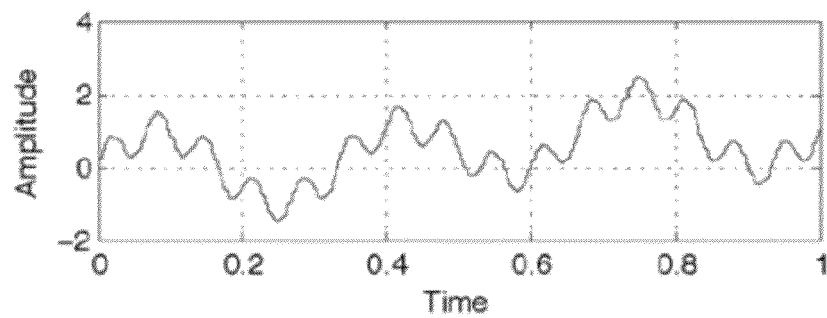

A first parametric study was conducted using two types of masking signals as $$m(t)=m_p(t)+m_d(t) \qquad (9)$$

where $m_p(t)$ was a sinusoidal signal simulating a periodic environmental variation (e.g., yearly fluctuation of air temperature), and $m_d(t)$ was a sigmoid signal simulating long-term drift of m(t) (e.g., air temperature drifting over multiple years). The modulating signal, $\mu^*(t)$, was chosen to be a sinusoidal signal with a higher frequency than the frequency of m(t). A sample set of signals used in the parametric study is shown in FIG. 3. In particular, FIG. 3(a) shows a periodic masking signal, $m_p(t)$, FIG. 3(b) shows a drifting masking signal, $m_d(t)$, FIG. 3(c) shows a masking signal, $m(t)=m_p(t)+m_d(t)$, and FIG. 3(d) shows a modulated signal, $m^*(t)=m(t)+\mu^*(t)$.

Figure 4A:
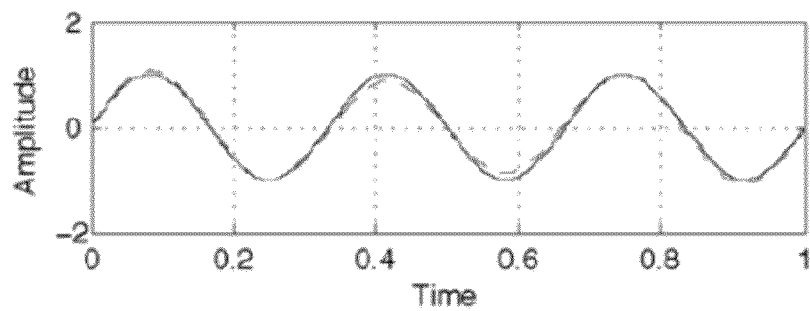
FIGS. 4(a)-(d) are graphs that compare mode mixing with and without the AMP process.
Figure 4B:
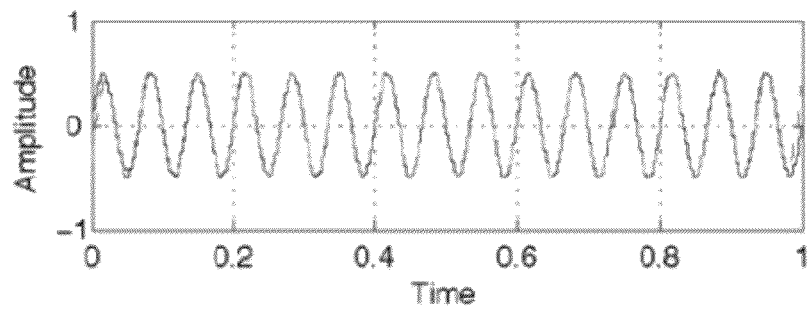
Figure 4C:
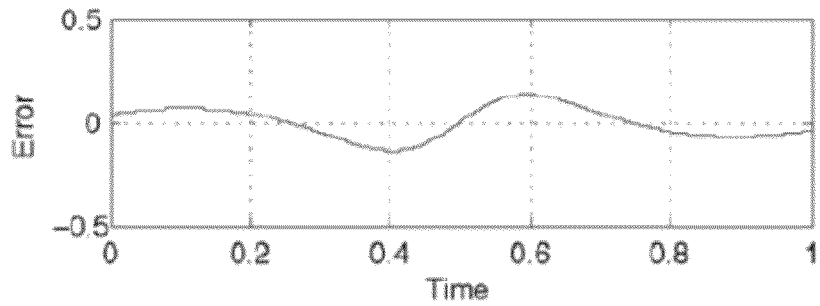

The above synthetically generated signals were processed using the EMD method with and without modulating signals. FIG. 4(a) shows the original $m_p(t)$ and resulting IMF($m_p$) without modulation using $\mu^*(t)$, and FIG. 4(c) shows the error between those two signals. The error shows that the IMF($m_p$) is interfered over time by the other masking signal, $m_d(t)$, due to mode mixing. To increase the detectability, it is desired that the IMF($m_p$) is not mode-mixed with $m_d(t)$, but with e(t).

Figure 4D:
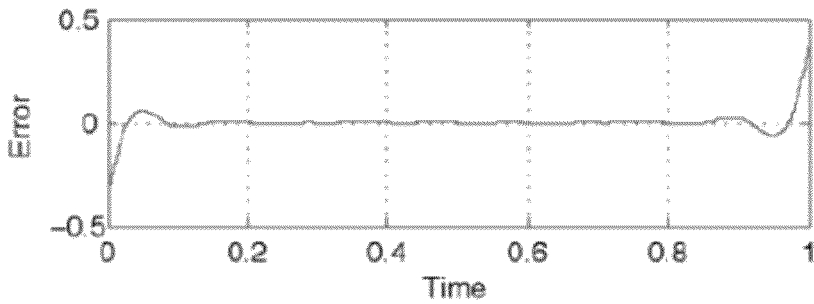

The mode-mixing effect in the IMF($m_p$) can be significantly reduced with the frequency modulation using $\mu^*(t)$. FIG. 4(b) shows the $\mu^*(t)$ and corresponding IMF of $\mu^*(t)$, and the error between those two signals is shown in FIG. 4(d). The error between the time range of 0.1 and 0.9 is almost zero and implies the interference by $m_d(t)$ becomes negligible in this time range. The interference reduction is because the frequency of $\mu^*(t)$ is further from the frequency of $m_d(t)$ than that of $m_p(t)$. In FIG. 4(d), however, the error is concentrated near the edges. This phenomenon is own as edge effect. Since the edge effect is influenced by $\mu^*(t)$, the parametric study was further conducted on the amplitude and frequency of $\mu^*(t)$ to minimize the edge effect.

The comparison in FIG. 4 illustrates the advantage of the AMP process with improved detectability by reducing error due to interference with the other masking signal in the middle section. The errors near the edges are due to the edge effect of the EMD. The parametric study was further conducted to investigate the effects of the frequency and amplitude of the modulating signal, $\mu^*(t)$.

Figure 5:
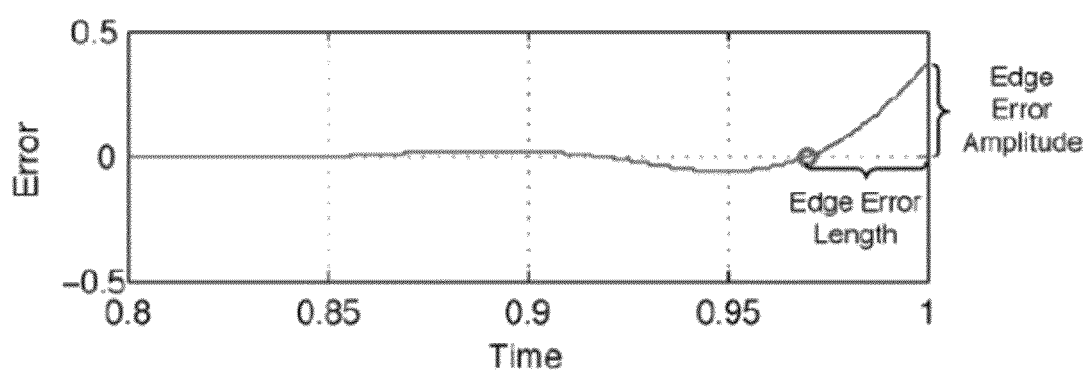
FIG. 5 is a diagram that illustrates the amplitude and length of edge error.

The influence of the frequency modulation on the edge effect was investigated for different frequencies of $\mu^*(t)$. The edge effect was measured in two ways: the amplitude and length of the edge error, $\epsilon=\text{IMF}(\mu^*)-\mu^*(t)$, as shown in FIG. 5.

Figure 6A:
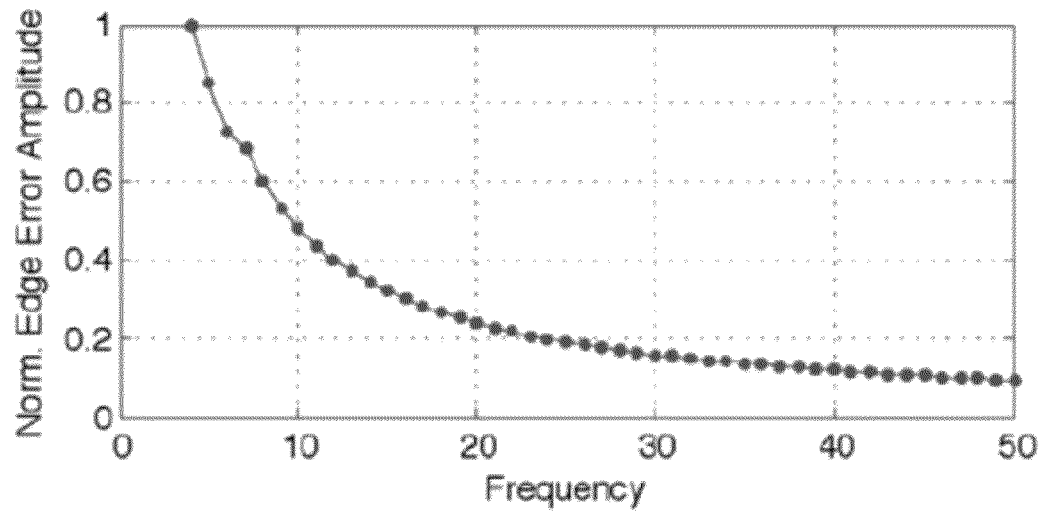
FIGS. 6(a) and 6(b) are diagrams that illustrate the effects of frequency on the amplitude and length of the edge error.
Figure 6B:
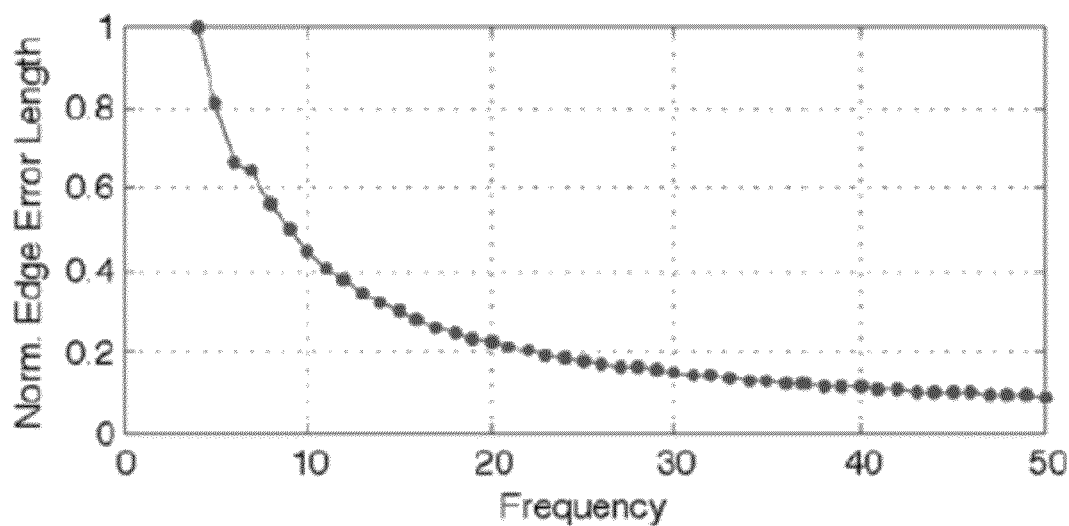

In the parametric study, the modulating frequency was selected to be larger than the frequency of the periodic masking signal, $m_p(t)$, which is the frequency of 3 as shown in FIG. 3(a). The results of the parametric study on the edge effects for different modulating frequencies are shown in FIG. 6(a), which illustrates the edge error amplitude, and FIG. 6(b) which illustrates the edge error length. For the comparison, the edge errors of amplitude and length were normalized to the errors at the frequency of 4, which was the lowest tested frequency. Both the edge error amplitude and length decayed exponentially as the modulating frequency increased. The decaying rate of frequency was measured using the least square estimation: 4.5 for the normalized edge error amplitude, and 3.9 for the normalized edge error length. Consequently, both normalized edge errors were reduced to approximately 10% at the frequency of 45 for the window length of 1.

Retaining Wall Application

The usefulness of the AMP process was evaluated in a case study performed using a full-scale reinforced concrete retaining wall that is 13.59 meters (m) tall. The material properties of the reinforced concrete and backfilled soil were unknown. Because the wall was placed only 9.5 m away from a high-rise residential apartment building, the collapse of the wall would result in a catastrophic disaster.

The retaining wall was monitored for three years with three tilt sensors located at the top, middle, and bottom of the wall. Three tilt gauges were mounted on the wall surface at 1.68 m, 6.55 m, and 13.14 m from the ground to measure the wall slope at each location. At the same locations of the tilt gauges, the surface temperatures were also measured. The sensor readings were sampled once every hour (1 sample/hour) for all channels using a digitizer and local storage device. Although wall surface temperature data were collected, only tilt data were used in the analysis to demonstrate that important information can be obtained using response-only data without relying on additional data of causative force and environmental factors in modeling process.

Figure 7:
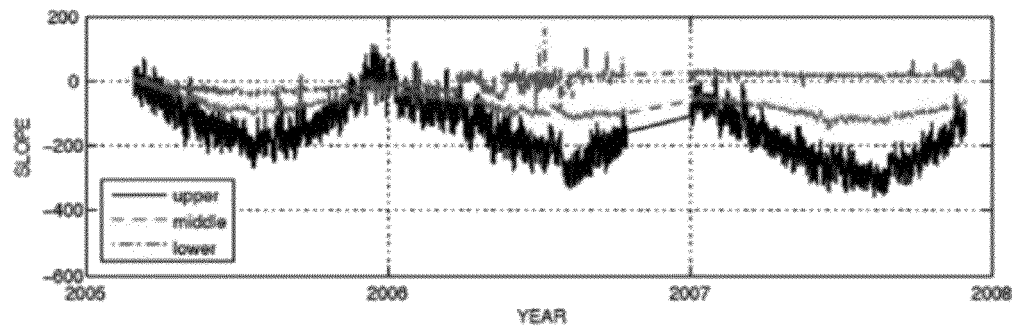
FIG. 7 is a graph that plots tilt time histories measured at three locations: the top, middle, and bottom of a retaining wall.

The tilt time histories measured from the retaining wall are shown in FIG. 7. The slope is in micro-radians (slope towards the apartment side is positive). As can be appreciated from FIG. 7, the slope signals at all three locations were significantly affected by seasonal and daily variation: decreasing during summer and increasing during winter, and decreasing during days and increasing during nights as reflected in daily trends (not shown in the figure). During the three-year monitoring period, the wall behavior was affected by temperature change in addition to rain and snow falls, free-thaw of backfilled soil, soil-structure interaction, and the like. FIG. 7 shows the complexity of the problem and how difficult it is to obtain important performance-related information out of a very limited amount of the raw sensor data.

FIG. 7 also shows that the collected sensor data are partially incomplete. The bottom sensor failed in Q1 of 2006 (approximately after one year). In addition, there were "missing" data for all sensors in Q4 of 2006 for about three months due to instrument failure. These unavoidable and unpredictable sensor and instrumentation problems are frequently encountered in long-term field measurements, and the proposed non-parametric methodology should be robust enough to handle these kinds of problems.

Precipitation is the most important environmental factor in the operation of retaining walls: rain and snow falls increase the water content, the weight of the backfilled soil, and the pore-water pressure. Because high pore-water pressures can cause the collapse of retaining walls, excessive water in the backfilled soil must be drained out properly.

Figure 8:
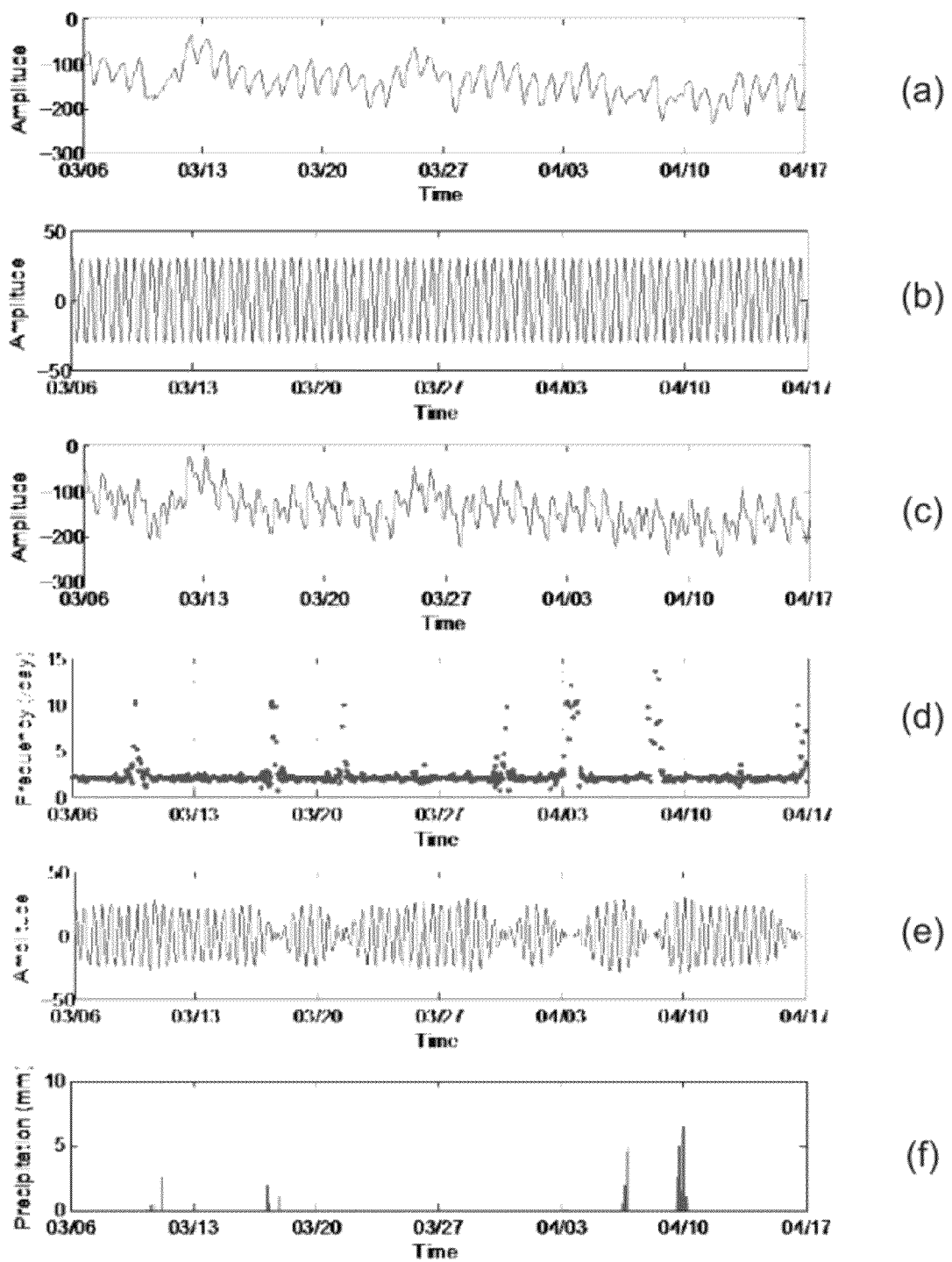
FIGS. 8(a)-(f) are diagrams that illustrate the results of the various steps of an example AMP process.

The AMD process was used to process the field measurements and the results are summarized in FIG. 8. FIG. 8(*a*) shows raw signals that were collected with a tilt gauge. FIG. 8(*b*) shows a reference signal of known amplitude and frequency that was created. In this example, a monotonic sinusoidal function with the frequency of two per day was selected. Examples of reference signals other than sinusoidal signals that can be used include sine-sweep, square, sawtooth, and broadbank random signals. FIG. 9 shows examples of monotonic and multitonic sinusoidal signals that can be used as a reference signal.

FIG. 8(*c*) shows a modulated signal that results from the combination of the raw signal (FIG. 8(*a*)) with the reference signal (FIG. 8(*b*)). The two signals can be combined using either the hardware approach or software approach, as described above. FIG. 8(*d*) shows the result after disentangling the signal whose frequency is close to that of the reference signal from the modulated signal. In this example, the signal with the frequency near two per day has been decomposed using EMD. That frequency is the frequency of the reference signal in FIG. 8(*b*). FIG. 8(*e*) shows the result of time-frequency analysis to detect abnormal patterns. In this example, HHT was used, although other time-frequency analysis techniques, such as the wavelet transform, can be used. The baseline frequency in FIG. 8(*e*) is at two per day, which is the same as the reference signal frequency. Abnormal patterns, as compared to the baseline frequency, are identified by the peaks in the figure. Finally, FIG. 8(*f*) shows the result of interpreting the detected abnormal events. In this example, the detected peaks (abnormal events) were caused from the change of the retaining wall motion due to an excessive amount of water in the backfilled soil after precipitation.

As can be appreciated from the above discussion, the accuracy of non-parametric data processing techniques can be even more improved using the AMP process. In the above-described field tests, the daily oscillation in time histories of the sensor measurements was used as the nominal pattern. Although the frequency of the daily trend (mainly due to daily temperature variation) remains mostly at 1/day, the trend is a nonlinear function (i.e., not a perfect sinusoidal function), so that the baseline frequency fluctuates over time. Also, using the daily trend, the frequency of the nominal pattern is limited to a diurnal scale. The pattern detectability can be significantly improved by intentionally mixing the raw sensor signal with a "small" reference signal with known amplitude and frequency.

Figure 10:
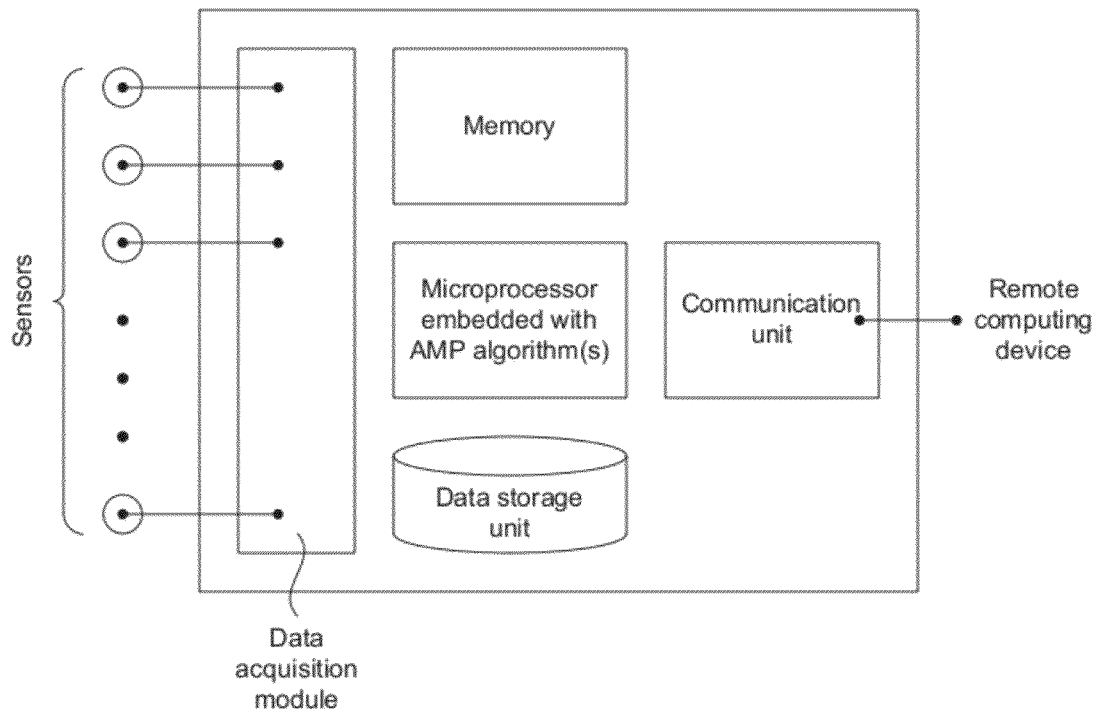
FIG. 10 is a block diagram of an embodiment of an AMP sensor.

An advantage of the auto-modulation technique described herein is that users can define the reference signal so that they do not have to rely on reference patterns in natural processes, such as the daily trend discussed in relation to FIG. 8. In some embodiments, the AMP process can be performed by a sensor that includes a data acquisition module, a microprocessor, memory, a data storage unit, unit, and a communication unit, as shown in FIG. 10. Substantially any type of sensor can be used to measure structural response. The sensors are connected to the data acquisition module to digitize the sensor reading. The digitized sensor data can then be processed with the microprocessor using embedded AMP algorithms to detect abnormalities in the structural response. Using the communication unit, the raw and processed data can be transmitted to remote computers or portable devices via wired or wireless communication protocols. Due to harsh environment at field sites, it may be advisable to protect the embedded computer in a ruggedized container.

Pavement Icing Application

A field test was also performed to see if the intermittent event of rainfall or icing of a pavement surface could be detected despite the presence of dominating environmental fluctuations. These dominating trends, especially the air temperature, significantly complicate both the nature of the problem by making the system response nonlinear and nonstationary, and inhibit the ability to detect the event of interest. In order to achieve this goal, it was necessary to conduct a full-scale experimental study using pavement surface temperature data collected from sensors during in-service traffic conditions.

Figure 11:
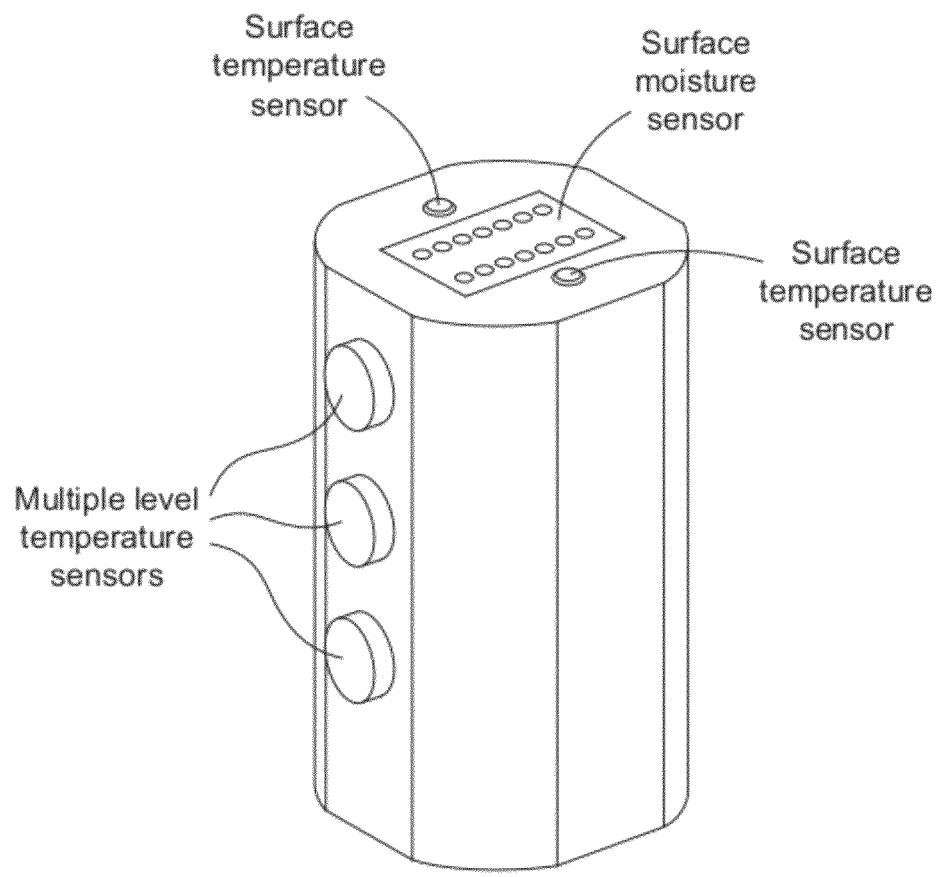
FIG. 11 is a schematic drawing of an in-house sensor cluster unit used in a highway pavement field test.

The location of the field test was on the Donghae Highway pavement, which is located in South Korea. Because the test was close in proximity to the Kangreung tunnel, this test was referred to as "KR5" during the duration of the project. Reliable sensors that were both cheap and efficient were required in order to conduct an experiment of this magnitude. Two different classes of sensors were used for KR5: "contact" and "noncontact." Pavement temperatures at different depths were collected using an RTD 4-Wire "contact" sensor (15 cm diameter). The RTD sensor also included a surface moisture sensor on the top to detect moisture on the road surface. The sensor was secured using the rapid curing MK-Crete 45 concrete mix. FIG. 11 shows a graphical depiction of the embedded sensor used for the field experiment.

Referring to FIG. 11, the level temperature sensors were used to measure pavement temperature at depths of 2 cm, 5 cm, and 8 cm below the pavement surface. Surface sensors were placed at the top to measure temperature and moisture.

Two types of "noncontact" sensors were used for KR5. First, an infra-red camera was mounted and secured using anchor bolts on top of a container to provide real-time camera footage of the pavement surface. The footage retrieved from the camera could be used for validation purposes when compared to the data. The second type of noncontact sensor was used to measure the ambient air temperature and the relative humidity for reference. The data from the sensors described were collected using a data acquisition (DAQ) system.

Figure 12:
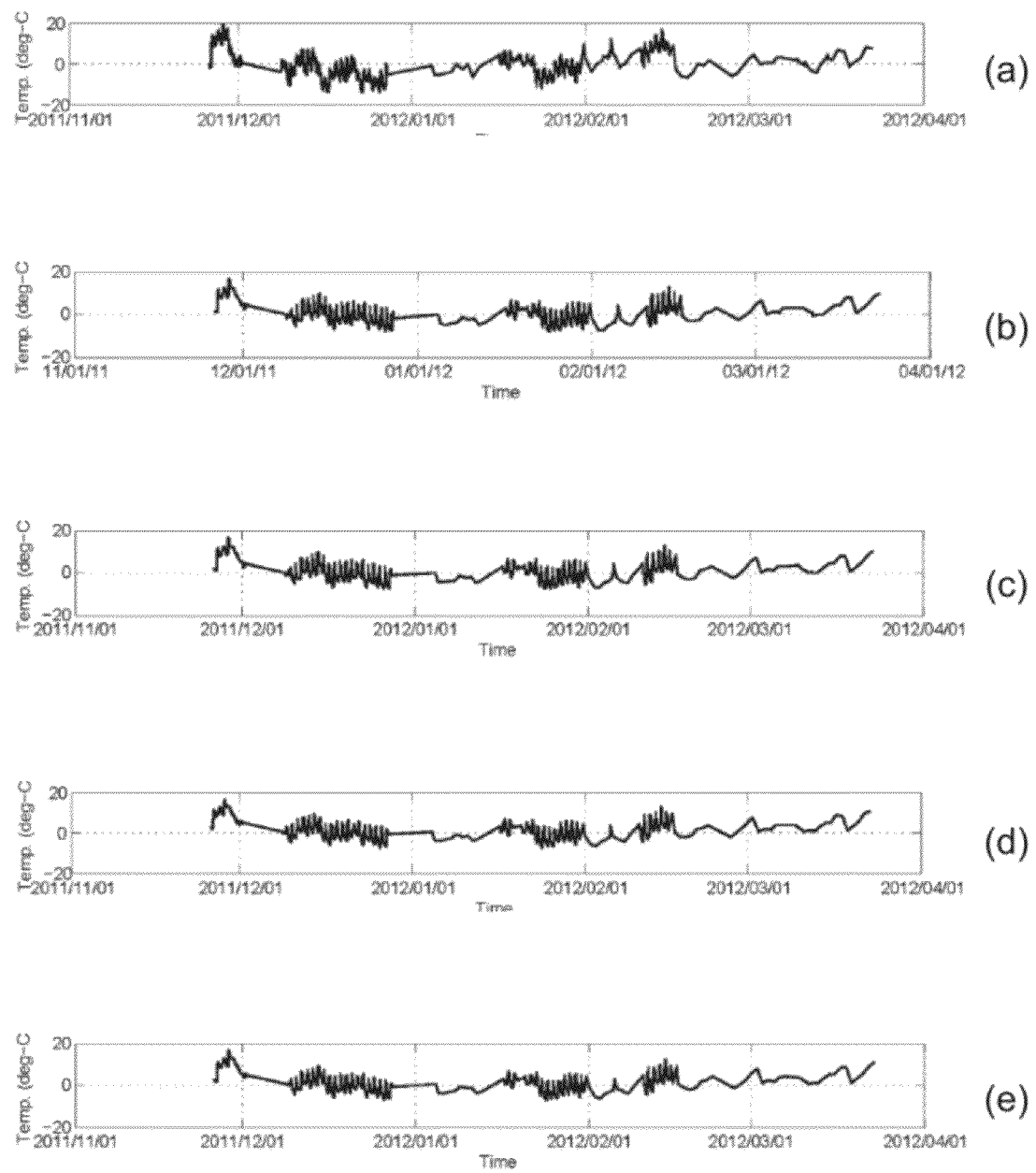
FIGS. 12(a)-(e) are temperature versus time plots obtained using temperature sensors shown in FIG. 11.

The data used for the experiment was recorded from November 2011 until March 2012. FIG. 12(*a*) shows the ambient air temperature for this time period. FIGS. 12(*b*)-(*e*) show the pavement temperature at different depths, i.e., 0 cm, 2 cm, 5 cm, and 8 cm, respectively. The data was sampled at a rate of one sample per second.

As can be appreciated from FIG. 12, it is very difficult to identify the exact times at which an intermittent rainfall event occurred because the data is nonlinear and nonstationary. Also, one may notice several unnatural trends, particularly during Dec. 2, 2011 to Dec. 8, 2011, Dec. 27, 2011 to Jan. 13, 2012, Feb. 1, 2012 to Feb. 10, 2012, and after Feb. 16, 2012. These unnatural trends represent the periods of time where the sensors stopped working, or when the data was unable to be retrieved. It should be noted that this is common and unavoidable in sensor measurement applications, and that it is critical to process the data using an algorithm that is robust enough to deal with sensor and measurement error.

Because of the extensive amount of data, the data used for the analysis was truncated to an approximately two week time period (from Jan. 16, 2012 to Jan. 30, 2012) in order to save processing time. This action can be justified by the fact that a two week time period possesses enough cycles (peaks and valleys) for EMD to decompose accurately. Furthermore, the data was undersampled from one sample per second to one sample per 30 seconds. Although this action reduces the sampling rate and therefore the resolution, it is still more than sufficient to describe the case of an abnormal event. As a result of these two actions, an enormous amount of processing time was saved, without reducing the accuracy or integrity of the results.

Figure 13:
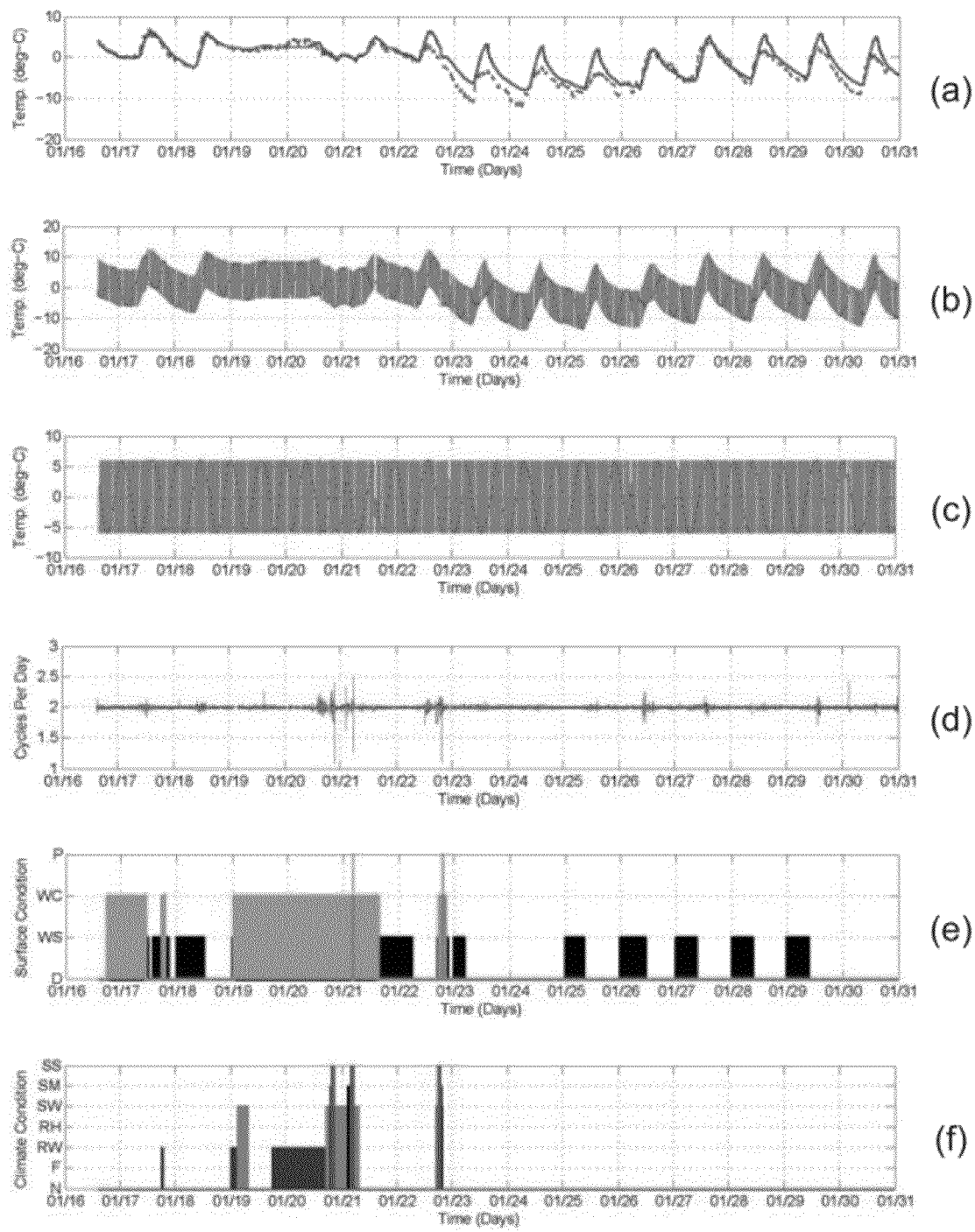
FIGS. 13(a)-(f) are diagrams that illustrate the results of AMP analysis performed in relation to a pavement icing field study.

A representative sample of the pavement surface temperature data was chosen for analysis, and the results are summarized in FIG. 13. The temperature is represented in degrees Celsius (° C.). The data was originally sampled at once per second (1 Hz). Due to the significant volume of data, however, the data was undersampled to a sampling rate of one sample per thirty seconds (1/30 Hz) to reduce the processing time. FIG. 13(a) shows the pavement surface temperature time history (solid line) with approximately two-week duration from Jan. 16, 2012 to Jan. 31, 2012. Significant daily trends, mostly due to air temperature fluctuation, were observed. One interesting phenomenon was also observed between January 18 and January 21, where the cyclic trend appears to flatten and much less fluctuation occurs. The air temperature (dashed line) during the same period is presented for comparison purposes. It should be noted that the AMP process was applied to the pavement surface temperature data only, and the air temperature data was not used in the analysis.

The raw surface temperature data in FIG. 13(a) was intentionally mixed with a synthetic sinusoidal modulating signal as per the AMP process, and the modulated signal was obtained, as shown in FIG. 13(b). The frequency of the modulating signal was one cycle per 30 minutes. This frequency was specifically tailored to detect those intermittent pattern changes that occurred within a short time span of 30 minutes as the temporal resolution of the timing of deicing solution spraying. The amplitude of the modulating signal was defined as ±6° C.

The modulated signal was then processed using the EMD method. The IMF corresponding to the user-defined modulating signal was selected with the known frequency and amplitude. FIG. 13(c) shows the IMF of the modulated signal. The following three stopping criteria of the sifting algorithm were used in the EMD process:

1. At each point, (mean_amplitude)<THRESHOLD2*(envelope_amplitude)
2. Mean of Boolean array {mean_amplitude/(envelope_amplitude)>THRESHOLD}<TOLERENCE
3. |# zeros−# extremal|≤1 where THRESHOLD=0.05, THRESHOLD2=0.5, and TOLERENCE=0.05 for all weather chamber data sets used in this study. The maximum iteration of the sifting process was set to be 2000.

Next, the IMF was transformed into the time-frequency domain using the HHT method. FIG. 13(d) shows the instantaneous frequency characteristics corresponding to the IMF of the modulating signal. The result can be confirmed as the baseline frequency coincides with 2 cycles per hour, which is the user-defined frequency of the modulating signal.

FIG. 13(d) is compared with the pavement surface and climate conditions in the same time scale shown in FIGS. 13(e) and 13(f), respectively. The surface and climate conditions were identified at every 30 minutes from visual inspection using the video camcorder records. Referring to FIG. 13(e), one can see that the first snow-piled event (P) occurred on January 21 from 04:00 AM to 05:30 AM. Observing FIG. 13(d), one can find a large peak corresponding to the same time that the snow-piled event occurred. The similar correlation between the peak of FIG. 13(d) and snow-piled event were observed on January 22 from 06:30 PM to 07:30:00 PM. Thus, these results show that the AMP process can detect the immediate pavement surface pattern change from a wet completely state (WC) to a snow-piled state (P), which is an important information to determine the timing of the deicing solution spraying.

The AMP process was also able to detect the change of the snow-weak event (SW) to snow-strong event (SS) shown in FIG. 13(f) on January 20 from 10:00 PM to 11:00 PM. In this time period, a prominent peak was observed in FIG. 13(d).

Figure 14:
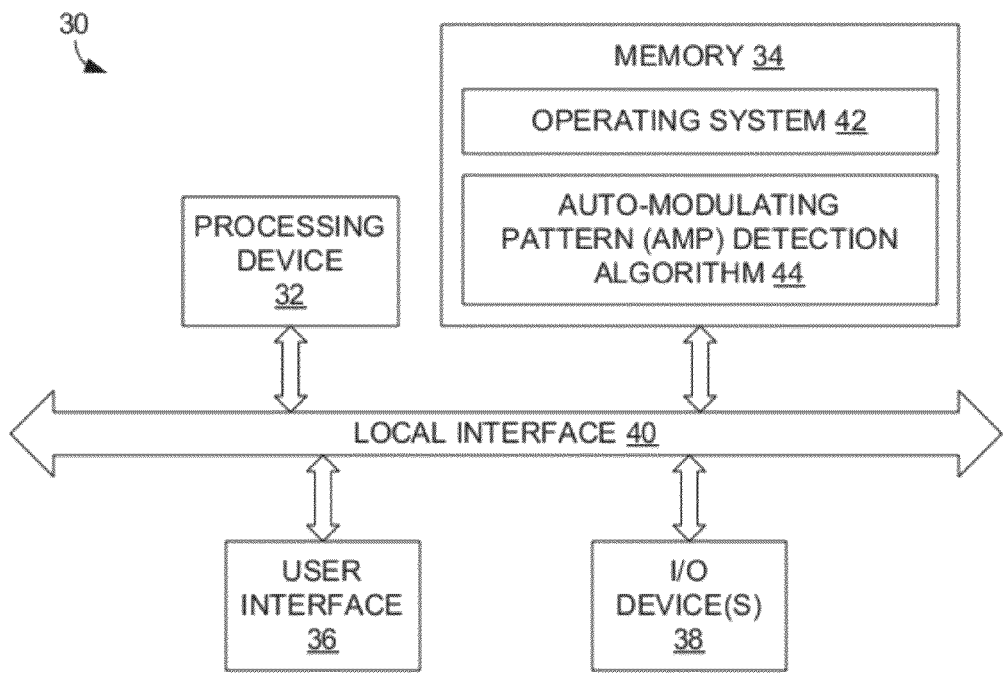
FIG. 14 is a block diagram of an embodiment of a computing device that can be used to performed AMP detection.

From January 23, it was observed that the climate condition remained normal. Although there was no wet climate event in this period, FIG. 13(e) showed the pavement condition was identified wet slightly (WS) approximately from the midnight to the midday. It was found that during night the pavement surface was wetted with night dew because of the dropped temperature and the surface dried after sunrise. The surface condition changes from the wet slightly state to the dry state were detected using the AMP process from January 25 to January 29. FIG. 14 illustrates an example configuration for a computing device 30 that can be used to perform at least some of the actions described above. As is shown in FIG. 14, the computing device 30 comprises a processing device 32, memory 34, a user interface 36, and at least one I/O device 38, each of which is connected to a local interface 40.

The processing device 32 can include a central processing unit (CPU) or a semiconductor based microprocessor (in the form of a microchip). The memory 34 includes any one of or a combination of volatile memory elements (e.g., RAM) and nonvolatile memory elements (e.g., hard disk, ROM, tape, etc.). The user interface 36 comprises the components with which a user interacts with the computing device 30, and the I/O devices 38 are adapted to facilitate communications with other devices.

The memory 34 is a non-transitory computer-readable medium and stores programs (i.e., logic) including an operating system 42 and an auto-modulating pattern (AMP) detection algorithm 44 that is adapted to perform an AMP process of the type described above.

The invention claimed is:

1. A method for detecting an environmental condition from sensed data, the method comprising:
monitoring a structure with a sensor to collect a raw signal that is generated by the structure and an environment in which the structure, the raw signal pertaining to a temporal trend of the structure and comprising an obfuscated event signal associated with a first environmental condition effecting the structure that has a small impact on the raw signal and a dominate sensor masking signal associated with a second environmental condition which obfuscates the first environmental condition;
modulating the raw signal with a reference signal to the raw signal to form a modulated signal that comprises the obfuscated event signal, the reference signal being a signal with a user-defined frequency;
decomposing the modulated signal to obtain a decomposed signal;
conducting time-frequency analysis on the decomposed signal to detect the obfuscated event signal and, thereby, the first environmental condition effecting the structure; and
interpreting the obfuscated event signal to identify the nature of the first environmental condition effecting the structure.

2. The method of claim 1, wherein the raw data comprises displacement data or temperature data that quantifies displacement or temperature of the monitored structure over a period of time.

3. The method of claim 1, wherein the reference signal comprises one of a sinusoidal, sine-sweep, beating, square, sawtooth, or broadband random function.

4. The method of claim 1, wherein the modulating comprises physically modulating a mechanical actuator using the reference signal.

5. The method of claim 1, wherein the modulating comprises synthetically mixing the reference signal with the raw signal using a computer.

6. The method of claim 1, wherein the decomposing of the modulated signal comprises performing a non-stationary decomposition technique on the modulated signal.

7. The method of claim 6, wherein the non-stationary decomposition technique comprises wavelet decomposition (WD) or empirical mode decomposition (EMD).

8. The method of claim 1, wherein conducting time-frequency analysis comprises processing the decomposed signal using Hilbert-Huang transformation (HHT).

9. A non-transitory computer-readable medium that stores an auto-modulating pattern (AMP) detection algorithm, the computer-readable medium comprising:
    logic configured to modulate a raw signal with a reference to form a modulated signal, the raw signal collected by a sensor associated with a structure and generated by the structure and an environment in which the structure exists, the raw signal pertaining to a temporal trend of the structure and comprising an obfuscated event signal associated with a first environmental condition effecting the structure that has a small impact on the raw signal and a dominate sensor masking signal associated with a second environmental condition which obfuscates the first environmental condition, wherein the modulated signal comprises the obfuscated event signal and wherein the reference signal being a signal having a user-defined frequency;
    logic configured to decompose the modulated signal to obtain a decomposed signal; and
    logic configured to conduct time-frequency analysis on the decomposed signal to detect the obfuscated event signal and, thereby, the first environmental condition effecting the structure.

10. The computer-readable medium of claim 9, wherein the logic configured to add a reference signal is configured to add one of a sinusoidal, sine-sweep, beating, square, sawtooth, or broadband random function to the raw signal.

11. The computer-readable medium of claim 9, wherein the logic configured to modulate the raw signal with the reference signal is configured to synthetically mix the reference signal with the raw signal.

12. The computer-readable medium of claim 9, wherein the logic configured to decompose the modulated signal comprises logic configured to perform a non-stationary decomposition technique.

13. The computer-readable medium of claim 12, wherein the logic configured to perform non-stationary decomposition technique comprises logic configured to perform wavelet decomposition (WD) or empirical mode decomposition (EMD) on the modulated signal.

14. The computer-readable medium of claim 9, wherein the logic configured to conduct time-frequency analysis comprises logic configured to process the decomposed signal using Hilbert-Huang transformation (HHT).

15. The computer-readable medium of claim 9, further comprising logic configured to interpret the obfuscated event signal and identify the nature of the environmental condition effecting the structure.

16. An auto-modulating pattern (AMP) sensor, comprising:
    a sensor element to collect a raw signal from a structure that is generated by the structure and an environment in which the structure exists, the raw signal pertaining to a temporal trend of the structure and comprising an obfuscated event signal associated with a first environmental condition effecting the structure that has a small impact on the raw signal and a dominate sensor masking signal associated with a second environmental condition which obfuscates the first environmental condition; and
    a processing device that is embedded with an AMP detection algorithm, the algorithm being configured to modulate the raw signal with a reference to form a modulated signal that comprises the obfuscated event signal, to decompose the modulated signal to obtain a decomposed signal, and to conduct time-frequency analysis on the decomposed signal to detect the obfuscated event signal and, thereby, the environmental condition effecting the structure wherein the reference signal being a signal with a user-defined frequency.

17. The sensor of claim 16, wherein the sensor element is configured to measure displacement.

18. The sensor of claim 16, wherein the sensor element is configured to measure temperature.

19. The sensor of claim 16, further comprising a communication unit with which the sensor can communicate data to a remote computing device.

* * * * *